United States Patent
Furukawa et al.

(10) Patent No.: US 7,158,458 B2
(45) Date of Patent: Jan. 2, 2007

(54) METHOD AND APPARATUS FOR RECORDING/REPRODUCING INFORMATION WITH RESPECT TO OPTICAL RECORDING MEDIUM

(75) Inventors: Shigeaki Furukawa, Kadoma (JP);
Kenichi Nishiuchi, Hirakata (JP);
Tetsuya Akiyama, Hirakata (JP); Kenji Narumi, Ibaraki (JP); Takashi Ishida, Yahata (JP); Mamoru Shoji, Sakai (JP);
Atsushi Nakamura, Kadoma (JP);
Shunji Ohara, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 123 days.

(21) Appl. No.: 11/100,194

(22) Filed: Apr. 5, 2005

(65) Prior Publication Data

US 2005/0201228 A1 Sep. 15, 2005

Related U.S. Application Data

(62) Division of application No. 09/538,877, filed on Mar. 30, 2000, now Pat. No. 6,906,988.

(30) Foreign Application Priority Data

Apr. 5, 1999 (JP) ................................. 11-097427
Apr. 8, 1999 (JP) ................................. 11-101045

(51) Int. Cl.
*G11B 7/00* (2006.01)

(52) U.S. Cl. ................. 369/47.55; 369/47.39; 369/47.42; 369/53.31; 369/47.5

(58) Field of Classification Search ............. 369/47.55, 369/47.39, 47.42, 47.5, 53.2, 53.31
See application file for complete search history.

(56) References Cited

U.S. PATENT DOCUMENTS 4,536,863 A 8/1985 Giddings (Continued)

FOREIGN PATENT DOCUMENTS

JP 7-129959 5/1995

*Primary Examiner*—Thang V. Tran
(74) *Attorney, Agent, or Firm*—Hamre, Schumann, Mueller & Larson, P.C.

(57) ABSTRACT

A method and an apparatus are provided, which enable a user's standby time to be shortened or utilized effectively in the course of recording/reproduction of information with respect to an optical disk. Information recorded on a disk is reproduced preferentially, and after counting for a predetermined period of time, recording learning is conducted. Alternatively, management information is reproduced preferentially over recording learning, and recording learning is conducted while a user is confirming this information. Alternatively, the possibility of recording on a disk is identified, and reproduction preference or recording learning preference processing is conducted based the possibility. Alternatively, a rotation speed of a disk is controlled to be variable or constant, based on the possibility of recording.

32 Claims, 8 Drawing Sheets

U.S. PATENT DOCUMENTS

| | | |
|---|---|---|
| 4,989,195 A | 1/1991 | Suzuki |
| 5,113,061 A | 5/1992 | Hisakatsu |
| 5,490,126 A | 2/1996 | Furumiya et al. |
| 5,515,080 A * | 5/1996 | Nakamura et al. .......... 345/534 |
| 5,636,194 A | 6/1997 | Furumiya et al. |
| 5,655,051 A * | 8/1997 | Furuta et al. ............... 386/105 |
| 5,729,513 A * | 3/1998 | Akahira et al. ............ 369/47.4 |
| 5,886,969 A | 3/1999 | Maeda et al. |
| 5,982,728 A * | 11/1999 | Okamoto et al. .......... 369/47.4 |
| 6,088,315 A * | 7/2000 | Ando ...................... 369/47.41 |
| 6,097,679 A * | 8/2000 | Ohtaki .................... 369/47.11 |
| 6,115,337 A * | 9/2000 | Takagi et al. ............. 369/47.33 |
| 6,118,743 A * | 9/2000 | Kumita .................... 369/47.44 |
| 6,137,766 A | 10/2000 | Utsumi |
| 6,424,788 B1 * | 7/2002 | Jang ........................... 386/46 |
| 6,762,983 B1 * | 7/2004 | Andoh ...................... 369/47.4 |

\* cited by examiner

METHOD AND APPARATUS FOR RECORDING/REPRODUCING INFORMATION WITH RESPECT TO OPTICAL RECORDING MEDIUM

This application is a Divisional of application Ser. No. 09/538,877, filed March 30, 2000 now U.S. Pat. No. 6,906,988, which application(s) are incorporated herein by reference.

BACKGROUND OF THE INVENTION

1. Field of the Invention

The present invention relates to a method and an apparatus for recording/reproducing information with respect to an optical recording medium by irradiating an optical recording medium, which has a thin film including a recording layer on a substrate, with a high-energy beam such as a laser beam. In particular, the present invention relates to a method enabling information recorded on an optical recording medium to be reproduced in a shorter period of time.

2. Description of the Related Art

Recently, optical recording media that allow information to be recorded/reproduced/deleted, and optical recording apparatuses that record/reproduce information with respect to the optical recording media have been commercialized. Furthermore, rewritable optical recording media with high density that allow animation of high quality to be recorded/reproduced, and optical recording apparatuses therefor have been studied and developed extensively. As a rewritable optical recording medium, a phase-change type optical recording medium is known, which has a chalcogenide thin film of Ge—Sb—Te, In—Sb—Te, or the like on a disk-shaped substrate with uneven tracks. A magneto-optical recording medium that has a metal thin film of Fe—Tb—Co or the like as a recording layer also is known.

In a phase-change type optical recording medium, for example, a recording thin film layer made of a phase-change material as described above is irradiated with a focused laser beam, whereby an irradiated portion is heated locally to a predetermined temperature. The irradiated portion shifts to a crystalline state when it reaches a crystallization temperature or higher, and it shifts to an amorphous state when it reaches a temperature exceeding a melting point, followed by rapid cooling. Either the amorphous state or the crystalline state is defined as a recording state or a deleting state (non-recording state), and an amorphous mark is formed on a medium with a pattern corresponding to an information signal, whereby recording is conducted. Furthermore, the change in these states is reversible, so that information is recorded or deleted repeatedly. The crystalline state and the amorphous state have different optical characteristics. Therefore, a signal can be reproduced by optically detecting a change in reflectance or in transmittance, utilizing the difference in characteristics.

In a magneto-optical recording medium, for example, a magneto-optical recording thin film is irradiated with a focused laser beam, so as to be heated locally to a predetermined temperature. A magnetic field is added to the film concurrently with heating, and a magnetization direction of the film is inverted in accordance with information, whereby information is recorded or rewritten repeatedly.

Hereinafter, a conventional method for recording/reproducing information with respect to an optical recording medium with high density will be described.

When an optical recording medium is loaded in an optical recording apparatus, the optical recording medium starts rotating. Then, the optical recording apparatus sets the laser power at reproduction power, and sets a servo condition for a laser beam to scan a track under a focus condition and a tracking condition for recording/reproducing information. In order to record information on the optical recording medium with optimum laser power, the power of a semiconductor laser is increased or decreased previously to extract the optimum write power (power learning). Furthermore, according to a method for correcting a recording pulse train appropriately in accordance with an information pattern to be recorded as suggested by JP 7-129959 A, an optimum recording pulse condition is extracted (recording pulse learning). When a series of operations is completed, the optical recording apparatus becomes capable of recording/reproducing information with respect to the optical recording medium, and information can be read from and recorded on the optical recording medium in accordance with a command from a personal computer.

However, in the case where the optical recording medium is loaded in the optical recording apparatus, and information is read from the optical recording medium as described above, the information starts being read only after a series of learning steps such as power learning, recording pulse learning, and servo learning is conducted and a host computer is informed that the optical recording apparatus becomes available. Thus, a lot of time is required for a series of learning steps. These learning steps are likely to take a longer period of time in an optical recording medium ready for high-density recording. In some cases, for example, tens of seconds are required for extracting an optimum recording condition by learning. Thus, the conventional method has a problem in that a user's waiting time (from loading an optical recording medium to reproducing data therefrom) becomes long.

Furthermore, during this waiting time, the user is just on standby without taking advantage of it.

SUMMARY OF THE INVENTION

Therefore, the present invention overcomes the above-mentioned problems, and its object is to shorten a user's standby time that has become longer along with the higher density of an optical recording medium.

Furthermore, it is another object of the present invention to utilize a user's standby time effectively.

In order to achieve the above-mentioned objects, the first optical recording/reproducing method of the present invention for optically recording or reproducing information with respect to an optical recording medium by using an optical recording apparatus, includes: a loading step of loading the optical recording medium in the optical recording apparatus; a reproduction power setting step of setting the power of laser light emitted from the optical recording apparatus to the optical recording medium at reproduction power; a management information reproduction step of reproducing management information for managing user information recorded on the optical recording medium with laser light having the reproduction power; and a recording learning step of extracting a recording condition suitable for the optical recording medium, wherein the recording learning step is conducted after the management information reproduction step.

According to the above-mentioned method, a learning operation can be performed while a user is confirming a directory and the like of information recorded on an optical recording medium.

In order to achieve the above-mentioned objects, the second optical recording/reproducing method of the present invention for optically recording or reproducing information with respect to an optical recording medium by using an optical recording apparatus, includes: a loading step of loading the optical recording medium in the optical recording apparatus; a reproduction power setting step of setting the power of laser light emitted from the optical recording apparatus to the optical recording medium at reproduction power; a preliminary information reproduction step of reproducing preliminary information recorded on the optical recording medium with laser light having the reproduction power; a count-up step of starting count-up of a time after completion of the preliminary information reproduction step; and a recording learning step of extracting a recording condition suitable for the optical recording medium, wherein the recording learning step is conducted after a time counted up during the count-up step becomes at least a predetermined time.

According to the above-mentioned method, a user's standby time can be shortened by conducting the count-up step.

According to the second optical recording/reproducing method, it is preferable that, in the count-up step, count-up is continued unless recording or reproduction of user information is requested, when recording of the user information is requested, a process proceeds to the recording learning step, and when reproduction of the user information is requested, the process proceeds to a user information reproduction step of reproducing user information recorded on the optical recording medium with laser light having the reproduction power, and after the user information reproduction step, count-up of a time is restarted after the counted time is reset.

Furthermore, it is preferable that the second optical recording/reproducing method further includes a recording learning preference mode and a reproduction preference mode that are selected alternatively, wherein, when the recording learning preference mode is selected, the process proceeds from the preliminary information reproduction step to the recording learning step, and when the reproduction preference mode is selected, the process proceeds from the preliminary information reproduction step to the count-up step.

Furthermore, it is preferable that, in the recording learning step conducted after the count-up step, when reproduction of user information is requested, the recording learning step is suspended, the process proceeds to a user information reproduction step of reproducing user information recorded on the optical recording medium, with laser light having the reproduction power, and the recording learning step is restarted after the user information reproduction step.

In order to achieve the above-mentioned objects, the third optical recording/reproducing method of the present invention for optically recording or reproducing information with respect to an optical recording medium by using an optical recording apparatus, includes: a loading step of loading the optical recording medium in the optical recording apparatus; a reproduction power setting step of setting the power of laser light emitted from the optical recording apparatus to the optical recording medium at reproduction power; and a recording possibility identifying step of identifying the possibility of recording information on the optical recording medium, based on a recording identifier, wherein, when prohibition of recording is identified in the recording possibility identifying step, a process proceeds to a user information reproduction step of reproducing user information recorded on the optical recording medium, with laser light having the reproduction power, or a reproduction standby step of waiting for a request for reproduction of the user information, and when permission of recording is identified in the recording possibility identifying step, a management information reproduction step of reproducing management information for managing user information recorded on the optical recording medium, with laser light having the reproduction power, and then a recording learning step of extracting a recording condition suitable for the optical recording medium are conducted.

In order to achieve the above-mentioned objects, the fourth optical recording/reproducing method of the present invention for optically recording or reproducing information with respect to an optical recording medium by using an optical recording apparatus, includes: a loading step of loading the optical recording medium in the optical recording apparatus; a reproduction power setting step of setting the power of laser light emitted from the optical recording apparatus to the optical recording medium at reproduction power; and a recording possibility identifying step of identifying the possibility of recording information on the optical recording medium, based on a recording identifier, wherein, when prohibition of recording is identified in the recording possibility identifying step, a process proceeds to a user information reproduction step of reproducing user information recorded on the optical recording medium, with laser light having the reproduction power, or a reproduction standby step of waiting for a request for reproduction of the user information, and when permission of recording is identified in the recording possibility identifying step, a preliminary information reproduction step of reproducing preliminary information recorded on the optical recording medium, with laser light having the reproduction power, a count-up step of starting count-up of a time after completion of the preliminary information reproduction step, and a recording learning step of extracting a recording condition suitable for the optical recording medium are conducted in this order, and the recording learning step is conducted after a time counted up during the count-up step becomes at least a predetermined time.

According to the third and fourth optical recording/reproducing method, a user's standby time can be shortened or utilized effectively by using the determination in the recording possibility identifying step.

According to the third and fourth optical recording/reproducing method, it is preferable that the recording identifier is provided at the optical recording medium. Alternatively, it is preferable that the recording identifier is provided at a case accommodating the optical recording medium. Alternatively, it is preferable that the recording identifier includes a first recording identifier provided at the optical recording medium and a second recording identifier provided at a case accommodating the optical recording medium.

In order to achieve the above-mentioned objects, the fifth optical recording/reproducing method of the present invention for optically recording or reproducing information with respect to an optical recording medium by using an optical recording apparatus, includes: a loading step of loading the optical recording medium in the optical recording apparatus; a reproduction power setting step of setting the power of laser light emitted from the optical recording apparatus to the optical recording medium at reproduction power; a recording possibility identifying step of identifying the possibility of recording information on the optical recording medium, based on a recording identifier; and a rotation speed control step of controlling a rotation speed of the optical recording medium, based on the identified possibility of recording, wherein, when prohibition of recording is identified during the recording possibility identifying step, a mode of prescribing a rotation speed of the optical recording medium to be constant is selected during the rotation speed control step, and when permission of recording is identified during the recording possibility identifying step, a mode of controlling a rotation speed of the optical recording medium for each region so as to alleviate the difference in scanning speed of the laser light in a plurality of regions partitioned based on a distance from a rotation center of the optical recording medium is selected during the rotation speed control step.

According to the above-mentioned method, the rotation speed control step is conducted in a required range by using the determination in the recording possibility identifying step. Furthermore, the frequency of altering the rotation speed during reproduction becomes low, which can shorten the search time of an arbitrary track. This results in a decrease in user's standby time.

According to the fifth optical recording/reproducing method, it is preferable that, when permission of recording is identified during the recording possibility identifying step, a rotation speed of the optical recording medium is controlled for each of the regions so that a scanning speed of laser light becomes substantially the same in the plurality of regions.

Furthermore, it is preferable that, when prohibition of recording is identified during the recording possibility identifying step, a user information reproduction step of reproducing user information recorded on the optical recording medium, with laser light having the reproduction power, or a reproduction standby step of waiting for a request for reproduction of the user information is conducted, and when permission of recording is identified during the recording possibility identifying step, a management information reproduction step of reproducing management information for managing user information recorded on the optical recording medium, with laser light having the reproduction power, and a recording learning step of extracting a recording condition suitable for the optical recording medium are further conducted in this order.

Furthermore, it is preferable that, when prohibition of recording is identified during the recording possibility identifying step, a user information reproduction step of reproducing user information recorded on an optical recording medium, with laser light having the reproduction power, or a reproduction standby step of waiting for a request for reproduction of the user information is further conducted, and when permission of recording is identified during the recording possibility identifying step, a preliminary information reproduction step of reproducing preliminary information recorded on the optical recording medium, with laser light having the reproduction power, a count-up step of starting count-up of a time after completion of the preliminary information reproduction step, and a recording learning step of extracting a recording condition suitable for the optical recording medium are conducted in this order, and the recording learning step is further conducted when a time counted up during the count-up step becomes at least a predetermined time.

According to the above-mentioned preferred embodiments, a user's standby time can be further shortened or utilized effectively.

Furthermore, it is preferable that the recording learning step is at least one selected from the group consisting of a recording power learning step of extracting laser emission power suitable for the optical recording medium, a recording pulse learning step of extracting a recording pulse condition suitable for the optical recording medium, a recording servo learning step of extracting a servo condition suitable for the optical recording medium during recording, a groove parameter learning step of determining a groove parameter of the optical recording medium, and an equalizing amount learning step of determining an equalizing amount with respect to the optical recording medium.

In order to achieve the above-mentioned objects, the first optical recording apparatus of the present invention for optically recording or reproducing information with respect to an optical recording medium, includes: loading means for loading the optical recording medium; an optical head for emitting laser light to the loaded optical recording medium; reproduction power setting means for setting the power of the laser light at reproduction power; information reproduction means for reproducing information recorded on the optical recording medium, with laser light having the reproduction power; recording learning means for extracting a recording condition suitable for the optical recording medium; and control means for allowing the information reproduction means to reproduce management information for managing user information recorded on the optical recording medium, and then, operating the recording learning means.

According to the above-mentioned structure, the learning operation can be performed while a user is confirming a directory and the like of information recorded on an optical recording medium.

In order to achieve the above-mentioned objects, the second optical recording apparatus of the present invention for optically recording or reproducing information with respect to an optical recording medium, includes: loading means for loading the optical recording medium; an optical head for emitting laser light to the loaded optical recording medium; reproduction power setting means for setting the power of the laser light at reproduction power; information reproduction means for reproducing information recorded on the optical recording medium, with laser light having the reproduction power; count-up means for starting count-up of a time after completion of a reproduction operation of preliminary information recorded on the optical recording medium by the information reproduction means; recording learning means for extracting a recording condition suitable for the optical recording medium; and control means for operating the recording learning means after a time counted up by the count-up means becomes at least a predetermined time.

According to the above-mentioned structure, a user's standby time can be shortened by utilizing the count-up means.

In the second optical recording apparatus, it is preferable that, during an operation of the count-up means, the control means allows the operation of the count-up means to continue unless recording or reproduction of user information is requested, when recording of the user information is requested, the control means operates the recording learning means, and when reproduction of the user information is requested, the control means allows the information reproduction means to reproduce information recorded on the optical recording medium with laser light having the reproduction power, and restarts the operation of the count-up means after resetting of a time counted up by the count-up means after completion of the operation of the information reproduction means.

Furthermore, it is preferable that the second optical recording apparatus further includes preferential mode selection means for selecting a recording learning preference mode and a reproduction preference mode alternatively, when the recording learning preference mode is selected by the preferential mode selection means, the control means operates the recording learning means after completion of a reproduction operation of the preliminary information by the information reproduction means, and when the reproduction preference mode is selected by the preferential mode selection means, the control means operates the count-up means after completion of the reproduction operation by the information reproduction means.

Furthermore, it is preferable that, during an operation of the recording learning means after an operation of the count-up means, when reproduction of user information is requested, the control means suspends the operation of the recording learning means to operate the information reproduction means, and restarts the operation of the recording learning means after completion of the operation of the information reproduction means.

In order to achieve the above-mentioned objects, the third optical recording apparatus of the present invention for optically recording or reproducing information with respect to an optical recording medium, includes: loading means for loading the optical recording medium; an optical head for emitting laser light to the loaded optical recording medium; reproduction power setting means for setting the power of the laser light at reproduction power; recording possibility identifying means for identifying the possibility of recording information on the optical recording medium based on a recording identifier; information reproduction means for reproducing information recorded on the optical recording medium with laser light having the reproduction power; recording learning means for extracting a recording condition suitable for the optical recording medium; and control means for, when prohibition of recording is identified by the recording possibility identifying means, operating the information reproduction means immediately after completion of operations of the recording possibility identifying means and the reproduction power setting means, or in response to a request for reproduction of the information after completion of operations of the recording possibility identifying means and the reproduction power setting means, and, when permission of recording is identified by the recording possibility identifying means, after completion of operations of the reproduction power setting means and the recording possibility identifying means, allowing the information reproduction means to reproduce management information for managing user information recorded on the optical recording medium, and then, operating the recording learning means.

Furthermore, in order to achieve the above-mentioned objects, the fourth optical recording apparatus of the present invention for optically recording or reproducing information with respect to an optical recording medium, includes: loading means for loading the optical recording medium; an optical head for emitting laser light to the loaded optical recording medium; reproduction power setting means for setting the power of the laser light at reproduction power; recording possibility identifying means for identifying the possibility of recording information on the optical recording medium based on a recording identifier; information reproduction means for reproducing information recorded on the optical recording medium with laser light having the reproduction power; count-up means for starting count-up of a time after completion of an operation of the information reproduction means; recording learning means for extracting a recording condition suitable for the optical recording medium; and control means for, when prohibition of recording is identified by the recording possibility identifying means, operating the information reproduction means immediately after completion of operations of the recording possibility identifying means and the reproduction power setting means, or in response to a request for reproduction of the information after completion of operations of the recording possibility identifying means and the reproduction power setting means, and when permission of recording is identified by the recording possibility identifying means, allowing the information reproduction means to reproduce preliminary information recorded on the optical recording medium after completion of operations of the recording possibility identifying means and the reproduction power setting means, operating the count-up means after completion of an operation of the information reproduction means, and operating the recording learning means after a time counted up by the count-up means becomes at least a predetermined time.

According to the third and fourth optical recording apparatus, a user's standby time can be shortened or utilized effectively by using the determination by the recording possibility identifying means.

It is preferable that, in the third and fourth optical recording apparatus, the recording identifier is provided at the optical recording medium. Alternatively, it is preferable that the recording identifier is provided at a case accommodating the optical recording medium. Alternatively, it is preferable that the recording identifier includes a first recording identifier provided at the optical recording medium and a second recording identifier provided at a case accommodating the optical recording medium.

In order to achieve the above-mentioned objects, the fifth optical recording apparatus of the present invention for optically recording or reproducing information with respect to an optical recording medium, includes: loading means for loading the optical recording medium; an optical head for emitting laser light to the loaded optical recording medium; reproduction power setting means for setting the power of the laser light at reproduction power; recording possibility identifying means for identifying the possibility of recording information on the optical recording medium based on a recording identifier; information reproduction means for reproducing information recorded on the optical recording medium with laser light having the reproduction power; rotation speed control means for controlling a rotation speed of the optical recording medium; and control means for, when prohibition of recording is identified by the recording possibility identifying means, selecting a mode of allowing the rotation speed control means to control a rotation speed of the optical recording medium to be constant, and when permission of recording is identified by the recording possibility identifying means, selecting a mode of allowing the rotation speed control means to control a rotation speed of the optical recording medium for each region so as to alleviate the difference in scanning speed of the laser light in a plurality of regions of the optical recording medium partitioned based on a distance from a rotation center.

According to the above-mentioned structure, the operation of the rotation speed control means is conducted in a required range by using the determination by the recording possibility identifying means. Furthermore, the frequency of altering the rotation speed during reproduction becomes low, which can shorten the search time of an arbitrary track. This results in a decrease in the user's standby time.

It is preferable that, in the fifth optical recording apparatus, when permission of recording is identified by the recording possibility identifying means, the control means controls a rotation speed of the optical recording medium for each region so that a scanning speed of laser light in a plurality of regions becomes substantially the same.

Furthermore, it is preferable that, when prohibition of recording is identified by the recording possibility identifying means, the control means operates the information reproduction means immediately after completion of an operation of the rotation speed control means, or in response to a request for reproduction of the information after completion of an operation of the rotation speed control means, and when permission of recording is identified by the recording possibility identifying means, after completion of an operation of the rotation speed control means, the control means allows the information reproduction means to reproduce management information for managing user information recorded on the optical recording medium, and operating recording learning means for extracting a recording condition suitable for the optical recording means.

Furthermore, it is preferable that, when prohibition of recording is identified by the recording possibility identifying means, the control means operates the information reproduction means immediately after completion of an operation of the rotation speed control means, or in response to a request for reproduction of the information after completion of an operation of the rotation speed control means, and when prohibition of recording is identified by the recording possibility identifying means, the control means allows the information reproduction means to reproduce preliminary information recorded on the optical recording medium after completion of an operation of the rotation speed control means, operates the count-up means after completion of an operation of the information reproduction means, and operates recording learning means for extracting a recording condition suitable for the optical recording medium after a time counted up by the count-up means becomes at least a predetermined time.

According to the above-mentioned preferred embodiments, a user's standby time can be further shortened or utilized effectively.

Furthermore, it is preferable that the recording learning means is at least one selected from the group consisting of recording power learning means for extracting laser emission power suitable for the optical recording medium, recording pulse learning means for extracting a recording pulse condition suitable for the optical recording medium, recording servo learning means for extracting a servo condition suitable for the optical recording medium during recording, groove parameter learning means for determining a groove parameter of the optical recording medium, and equalizing amount learning means for determining an equalizing amount with respect to the optical recording medium.

As described above, according to the above-mentioned method and structure, the recording learning step is conducted after a directory content and the like of recorded information is transferred to a host computer, whereby a learning operation can be performed while a user is confirming the directory content and the like of recorded information on the host computer side. Therefore, a user's standby time involved in a series of recording learning steps can be shortened to be substantially negligible.

Furthermore, information recorded on an optical recording medium is reproduced preferentially, and recording learning is conducted after a predetermined standby time. This allows a reproduction operation to be performed preferentially, and substantially shortens a period of time required for enabling information to be reproduced from the optical recording medium. Furthermore, because of the function of conducting recording learning after a predetermined period of time, a user substantially can ignore a time for recording learning.

Furthermore, when recording on an optical recording medium is prohibited, a series of recording learning steps required for recording, rewriting, and deleting information are omitted. Therefore, an optical recording apparatus is put in a standby state for reproducing information in a short period of time.

Particularly in the case of a write-protected optical recording medium, even when a light beam moves in a radial direction of the optical recording medium during reproduction, a rotation speed becomes constant. Alternatively, the frequency of altering a rotation speed is decreased, so that a time required for altering a rotation speed can be shortened.

These and other advantages of the present invention will become apparent to those skilled in the art upon reading and understanding the following detailed description with reference to the accompanying figures.

DESCRIPTION OF THE PREFERRED EMBODIMENTS

Hereinafter, the optical recording/reproducing method and optical recording apparatus of the present invention will be described by way of preferred embodiments with reference to the drawings.

Embodiment 1

Figure 1:
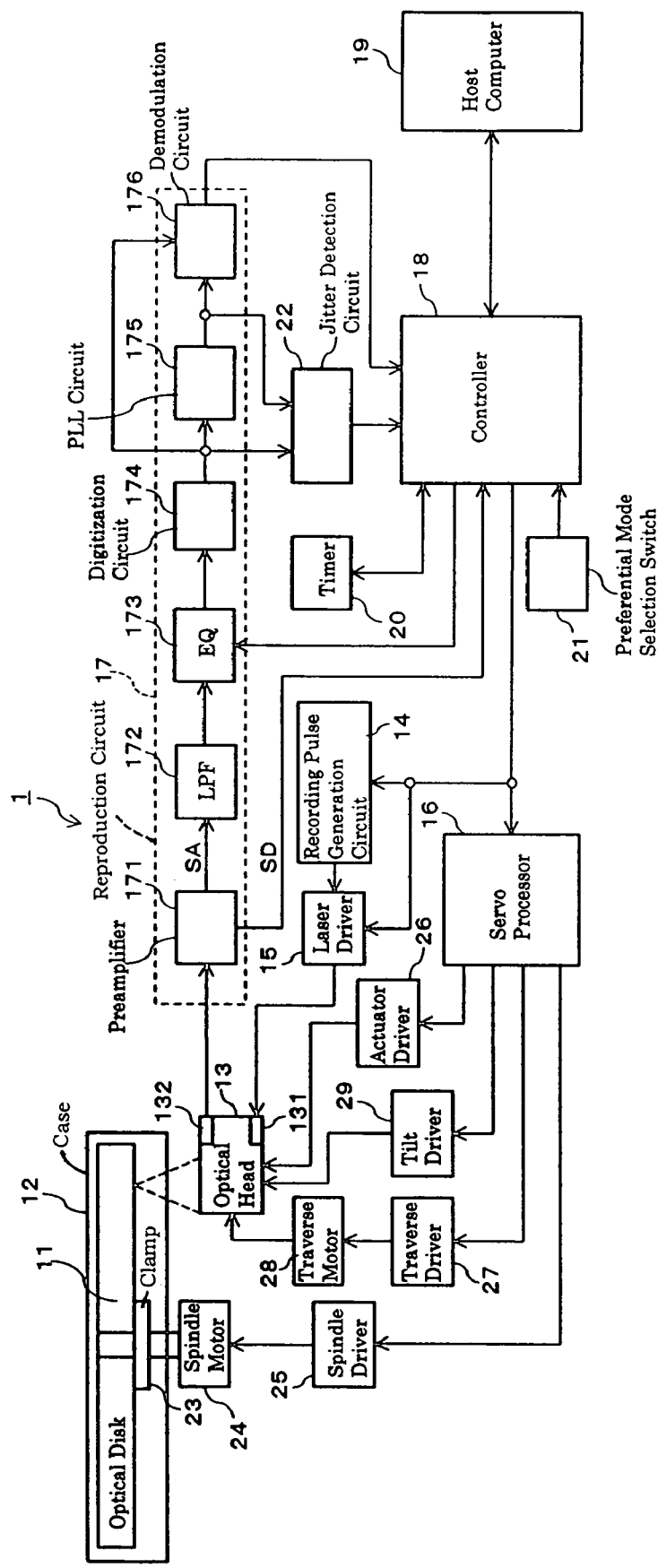
FIG. 1 is a block diagram showing a structure of an optical recording apparatus in Embodiment 1 according to the present invention.

FIG. 1 is a block diagram showing a schematic structure of an optical recording apparatus in the present embodiment.

Referring to FIG. 1, an optical recording medium 11 (optical disk) is loaded in an optical recording apparatus 1 via a clamp 23. The optical disk 11 is accommodated in a case (cartridge) for protection of its surface. An optical head 13 focuses light emitted from a built-in semiconductor laser 131 onto the optical disk 11. The optical head 13 also guides light reflected from the optical disk 11 to a built-in photodetector 132, and converts the light into an electric signal for output. The photodetector 132 is designed as a 2-divided photodetector disposed in such a manner that a dividing line is in parallel with a track of the optical disk 11 (i.e., directed so as to detect a push-pull tracking error signal).

Furthermore, the optical recording apparatus 1 includes a recording pulse generation circuit 14 for generating a recording pulse in accordance with information to be recorded, and a laser driver 15 for irradiating the optical disk 11 with laser light at a predetermined emission power in response to an output signal from the recording pulse generation circuit 14. In reproducing information, the laser driver 15 allows the semiconductor laser 131 in the optical head 13 to emit D.C. light at set reproduction laser power. In recording information, the laser driver 15 allows the semiconductor laser 131 to emit pulsed light at set recording laser power in response to a servo clock (SCLK) supplied from a phase-locked loop (PLL) circuit 175 (described later).

A servo processor 16 allows a spindle driver 25 to drive a spindle motor 24, thereby rotating the optical disk 11 loaded via the clamp 23 at a constant linear velocity (CLV) or a constant angular velocity (CAV).

The servo processor 16 also controls focusing of a light beam by allowing an actuator driver 26 to drive an objective lens actuator (not shown) in the optical head 13 in a direction parallel to an emission direction of a light beam, based on error information such as a focus error signal (FE) and a tracking error signal (TE) detected from the optical disk 11. Similarly, the servo processor 16 controls tracking of a light beam by allowing the actuator driver 26 to drive the objective lens actuator in a direction parallel to a radial direction of the optical disk.

Furthermore, the servo processor 16 allows a traverse driver 27 to drive a traverse motor 28 that moves the entire optical head 13 in a radial direction, thereby controlling a positional movement of the entire optical head 13. The servo processor 16 also allows a tilt driver 29 to drive a tilt actuator (not shown) connected to the optical head 13, thereby controlling a radial tilt position and a tangential tilt position of the optical head 13.

A reproduction circuit 17 demodulates light reflected from the optical disk 11 to an information signal. The reproduction circuit 17 includes: a preamplifier 171 for amplifying respective optical current signals obtained from the 2-divided photodetector 132 in the optical head 13 by addition and subtraction, and outputting an addition signal (SA) and a subtraction signal (SD) to a low-pass filter (LPF) 172 (described later) and a controller 18 (described later), respectively; an LPF 172 for removing a harmonic component from the addition signal SA supplied from the preamplifier 171; an equalizer (EQ) 173 for equalizing the waveform of a signal that has been filtered by the LPF 172 with a predetermined equalizing amount set by the controller 18 (described later); a digitization circuit 174 for converting an analog information signal to a pulse information signal by a comparator or the like; a PLL circuit 175 for, in synchronization with a pulse signal from the digitization circuit 174, multiplying its frequency to generate a servo clock; and a demodulation circuit 176 for demodulating a modulated pulse information signal from the digitization circuit 174 based on a servo clock generated in the PLL circuit 175 to output the demodulated signal to the controller 18 (described later).

The controller 18 controls a series of operations in the recording pulse generation circuit 14, the laser driver 15, the servo processor 16, and the reproduction circuit 17, and communicates with an external host computer to transmit/receive information to be recorded and reproduced.

The controller 18 is connected to a timer 20 and a preferential mode selection switch 21, operations of which will be described in later embodiments.

Furthermore, the controller 18 is supplied with an output from a jitter detection circuit 22. The jitter detection circuit 22 receives a pulse information signal from the digitization circuit 174 and a servo clock from the PLL circuit 175 in the reproduction circuit 17 to detect a jitter amount in the detected information signal. The jitter detection circuit 22 is used for determining optimum recording power in recording power learning; an optimum recording pulse width, an optimum fore-and-aft edge position, an optimum leading and trailing edge pulse position and the like in recording pulse learning; an optimum focus position, an optimum tracking position, an optimum radial tilt position, and an optimum tangential tilt position in recording servo learning; a groove parameter in groove parameter learning of the optical disk 11, and an optimum equalizing amount set in the EQ 173 in equalizing amount learning, which will be described later.

A procedure of an optical recording/reproducing method by the optical recording apparatus 1 constructed as above will be described with reference to a flow chart in FIG. 2.

Figure 2:
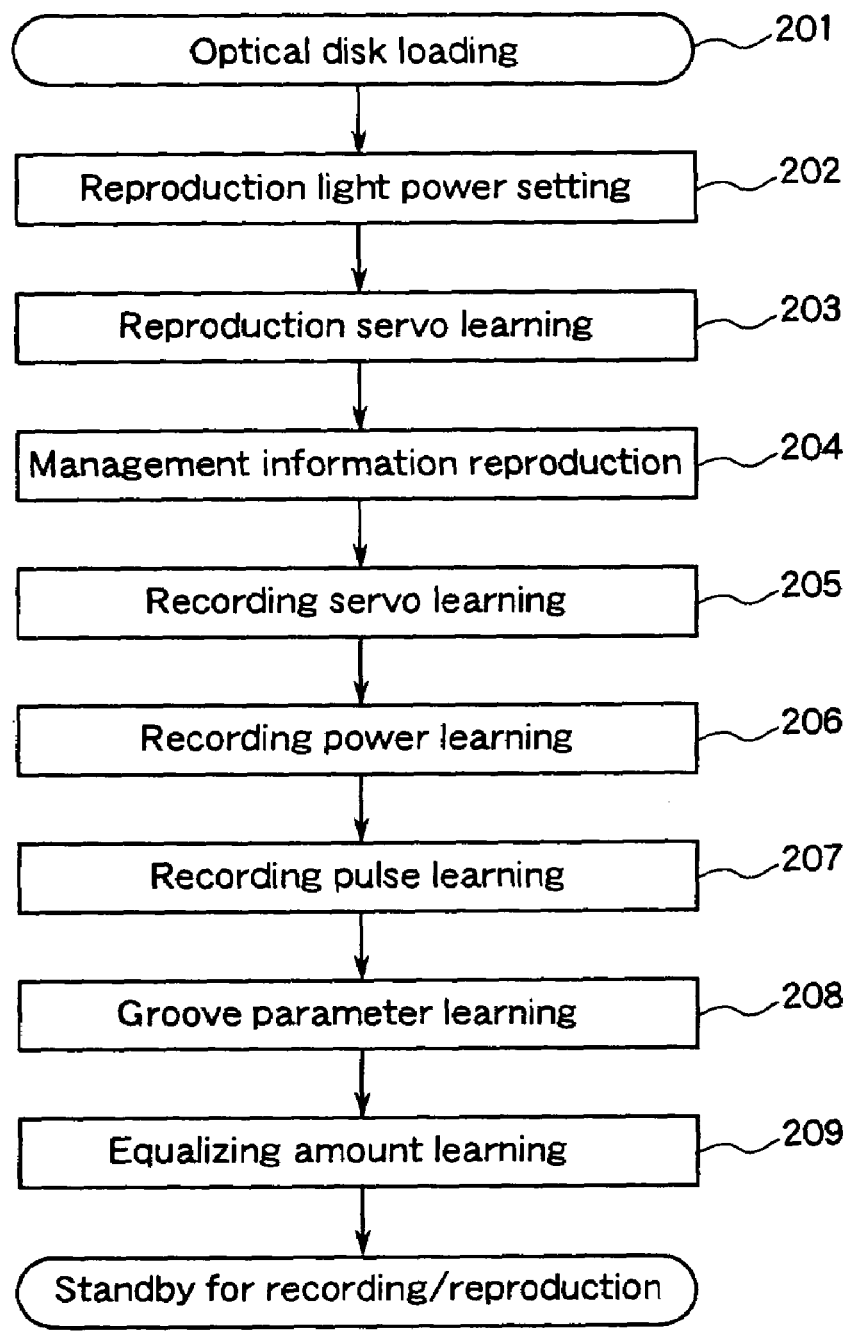
FIG. 2 is a flow chart showing a procedure of an optical recording/reproducing method in Embodiment 1 according to the present invention.

In an optical disk loading step 201 shown in FIG. 2, when the case 12 accommodating the optical disk 11 is inserted into the optical recording apparatus 1 and loaded onto the clamp 23, the controller 18 outputs a command for driving a spindle to the servo processor 16. Then, the servo processor 16 allows the spindle driver 25 to drive the spindle motor 24 so as to rotate the optical disk 11 at a predetermined rotation rate.

In a reproduction light power setting step 202, the laser driver 15 is put in a reproduction mode, and sets the irradiation intensity of a light beam from the semiconductor laser 131 built in the optical head 13 at reproduction power. In a reproduction servo learning step 203, the controller 18 outputs a search command to the servo processor 16. The servo processor 16 allows the actuator driver 26 to drive the objective lens actuator (not shown) in the optical head 13, and reproduction tracking position learning and reproduction focus position learning required for a light beam to reproduce a previously recorded region in the optical disk 11 are conducted.

Next, the controller 18 outputs a command for traverse drive to the servo processor 16. The servo processor 16 allows the traverse driver 27 to drive the traverse motor 28, and moves the optical head 13 to a predetermined position so as to reproduce management information (e.g., a FAT region of MS-DOS and Windows, a directory, or folder information) in which positional information and the like of data recorded on the optical disk 11 are recorded.

In a management information reproduction step 204, the reproduction circuit 17 demodulates an output signal from the photodetector 132 built in the optical head 13 to a management information signal. The demodulated signal is sent to the host computer 19 via the controller 18. More specifically, in the step 204, a user can confirm a directory and the like of information recorded on the optical disk 11 via a display (not shown) connected to the host computer 19.

During user's confirmation, a recording learning step is conducted. The recording learning step includes a recording servo leaning step 205, a recording power learning step 206, a recording pulse learning step 207, a groove parameter learning step 208, and an equalizing amount learning step 209.

The recording servo learning step 205 includes a recording focus position learning step, a recording tracking position learning step, a recording radial tilt position learning step, and a recording tangential position learning step.

In the recording focus position and recording tracking position learning steps, the servo processor 16 receives a command from the controller 18, and allows the traverse driver 27 to drive the traverse motor 28, thereby moving the optical head 13 to a test recording region provided on an inner peripheral side, an outer peripheral side, or both the inner peripheral side and the outer peripheral side, other than a user information recording region. Then, the servo processor 16 allows the actuator driver 26 to drive the objective lens actuator (not shown) in the optical head 13, thereby conducting test recording while changing a focus position and a tracking position and reproducing a signal from the test recording region. The jitter detection circuit 22 measures a jitter amount of the reproduced signal, and an optimum focus position and an optimum tracking position are determined where the jitter amount is a minimum or a predetermined value or less.

In the recording radial tilt position and recording tangential position learning steps, the servo processor 16 receives a command from the controller 18, and allows the tilt driver 29 to drive the tilt actuator (not shown) connected to the optical head 13. Thus, test recording in the test recording region is conducted while changing a radial tilt position and a tangential tilt position, and a signal from the test recording region is reproduced. The jitter detection circuit 22 measures a jitter amount as the quality of the reproduced signal, and an optimum radial tilt position and an optimum tangential tilt position are determined where the jitter amount becomes minimum or a predetermined value or less.

When the recording servo learning step 205 is completed as described above, the process proceeds to the recording power learning step 206.

In the recording power learning step 206, the servo processor 16 receives a command from the controller 18, and allows the traverse driver 27 to drive the traverse motor 28, thereby moving the optical head 13 to the test recording region. Then, the controller 18 allows the laser driver 15 to change the irradiation intensity of laser light in stages for test recording. The laser driver 15 is put in a reproduction mode, and the optical head 13 reproduces the test recording region. The jitter detection circuit 22 measures a jitter amount as the quality of the reproduced signal, and a recording region is extracted where the jitter amount is minimum or a predetermined value or less to set laser light irradiation intensity used for recording an extraction region as optimum recording power.

In the recording pulse learning step 207, the servo processor 16 receives a command from the controller 18, and allows the traverse driver 27 to drive the traverse motor 28, thereby moving the optical head 13 to the test recording region. Then, the controller 18 allows the recording pulse generation circuit 4 to change a recording pulse width, a fore-to-aft edge position, or a leading and trailing edge pulse position in stages for test recording. Then, the laser driver 15 is put in a reproduction mode, and the optical head 13 reproduces the test recording region. The jitter detection circuit 22 measures a jitter amount as the quality of the reproduced signal, and a recording region is extracted where the jitter amount is minimum or a predetermined value or less to set a recording pulse used for recording the extraction region as an optimum recording pulse.

In the groove parameter learning step 208, the servo processor 16 receives a command from the controller 18, and allows the traverse driver 27 to drive the traverse motor 28, thereby moving the optical head 13 to the test recording region for test recording. Then, switching to a reproduction mode is done by the controller 18. Then, the controller 18 receives a subtraction signal (SD) amplified by the preamplifier 171 from the 2-divided photodetector 132, and memorizes a wobble pit amplitude in a track during test recording. The presence of fingerprints and contamination on the optical disk 11 is detected based on the wobble pit amplitude, and a set value of recording power is corrected.

The groove parameter learning step 208 may be replaced by another method as long as an index indicating a groove shape can be obtained.

In the equalizing amount learning step 209, the servo processor 16 receives a command from the controller 18, and allows the traverse driver 27 to drive the traverse motor 28, thereby moving the optical head 13 to the test recording region for test recording. Then, switching to a reproduction mode is done by the controller 18. A reproduced signal is received while changing an equalizing amount (e.g., a boost amount) set for the equalizer (EQ) 173. The jitter detection circuit 22 measures a jitter amount as the quality of the reproduced signal, and an optimum equalizing amount is determined where the jitter amount becomes minimum or a predetermined value or less.

In the above-mentioned recording learning step, the jitter detection circuit 22 measures a jitter amount of a reproduced signal to determine an optimum recording condition. However, a method for detecting a bit error rate may be used.

After the above-mentioned steps, the optical recording apparatus 1 is put in a standby state for recording/reproducing actual user information, and it becomes capable of reproducing, additionally recording, rewriting, and deleting a content recorded on the optical disk 11.

As described above, according to the procedure shown in FIG. 2, when the optical disk 11 is loaded in the optical recording apparatus 1, first, a directory content of information recorded on the optical disk 11 is allowed to be reproduced, and the information is transferred preferentially to the host computer. Thereafter, the recording servo learning step 205, the recording power learning step 206, the recording pulse learning step 207, the groove parameter learning step 208, and the equalizing amount learning step 209 are conducted. More specifically, a learning operation can be conducted while a user is confirming the directory of recorded information on the host computer 19 side. Therefore, a user substantially can ignore a time loss involved in a series of recording learning steps.

Embodiment 2

An optical recording/reproducing method will be described with reference to FIG. 3, in which recording learning is conducted, following standby for a predetermined period of time after reproduction becomes possible.

Figure 3:
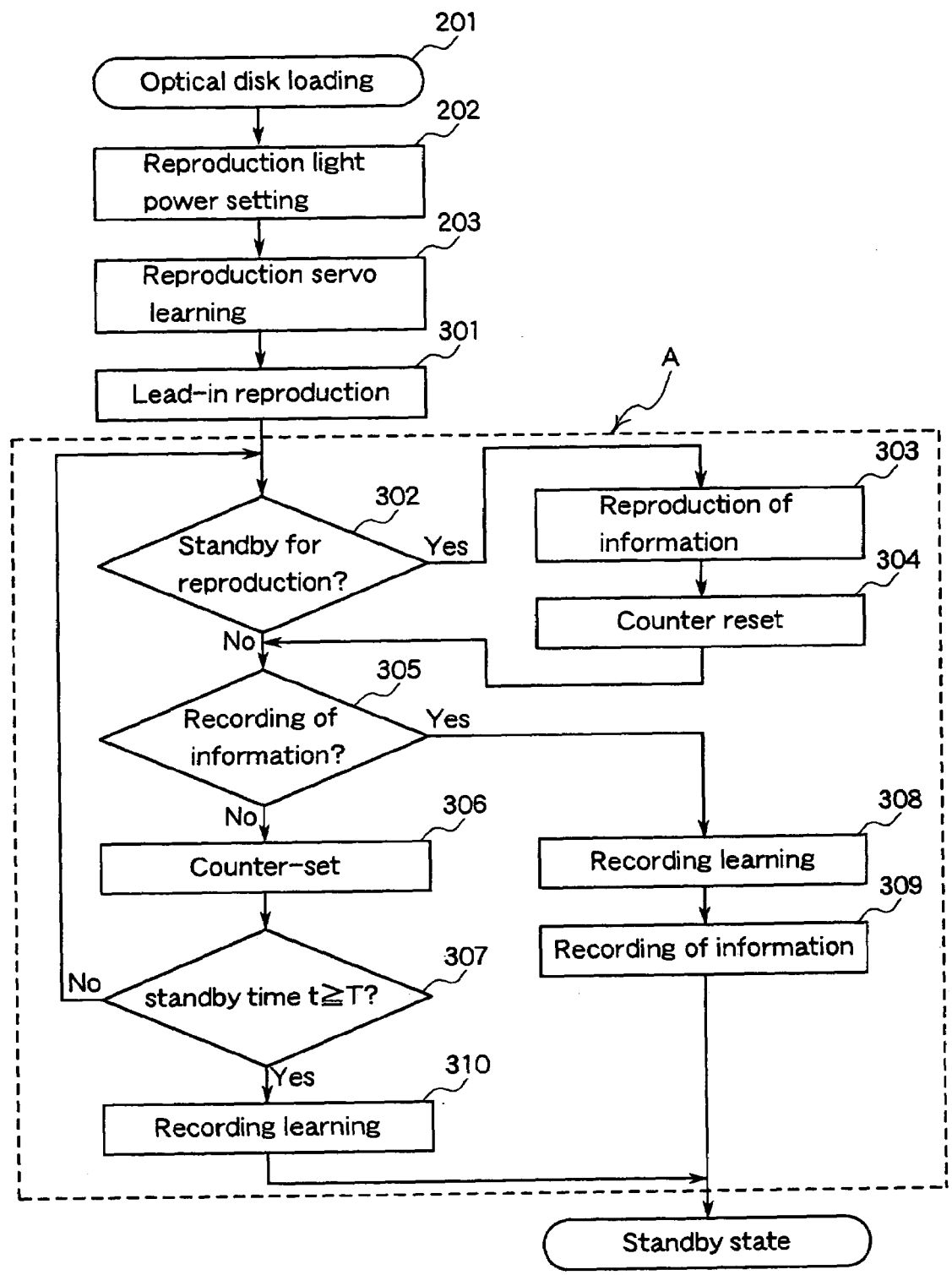
FIG. 3 is a flow chart showing a procedure of an optical recording/reproducing method in Embodiment 2 according to the present invention.

FIG. 3 is a flow chart showing a procedure of an optical recording/reproducing method in the present embodiment. As an optical recording apparatus that functions in accordance with the procedure in FIG. 3, the optical recording apparatus 1 shown in FIG. 1 can be used. In the present embodiment, a timer 20 for counting a standby time is also used. In FIG. 3, the same operations as those in Embodiment 1 are performed from the optical disk loading step 201 to the reproduction servo learning step 203; therefore, the description thereof is omitted here.

In a lead-in reproduction step 301, the optical head 13 reproduces a lead-in region provided on the optical disk 11 where the information on the kind and a reproduction condition of the optical disk 11 is recorded. Herein, the information recorded in the lead-in region is referred to as preliminary information.

In a reproduction standby determination step 302, it is determined whether or not further information is reproduced after the preliminary information in the lead-in region is reproduced. When reproduction is suspended (No) based on the determination, the process proceeds to an information recording determination step 305. When it is determined in the information recording determination step 305 that the host computer 19 does not request recording, a counter of the timer 20 is set in a counter-set step 306, and counts up a standby time t. When it is determined in the standby time determination step 307 that the standby time t thus counted up is shorter than a predetermined reference standby time T (No), a count-up step formed of a processing loop (steps 302, 305, 306, and 307) is repeated. On the other hand, when the standby time t is equal to or longer than a predetermined reference standby time T (Yes), the recording learning step 310 is conducted, and the optical disk 11 is put in a standby state for recording/reproducing information.

When reproduction of information is continued in the reproduction standby determination step 302 (Yes), the process proceeds to an information reproduction step 303. In the information reproduction step 303, the optical head 13 is moved so as to reproduce information recorded on the optical disk 11. In this case, management information of the optical disk 11 or data information may be reproduced as described in Embodiment 1. In a counter-reset step 304, the timer 20 counting a standby time is reset.

Next, the case will be described where it is determined in the information recording determination step 305 that the host computer 19 requests recording. In a recording learning step 308, the recording learning as described in Embodiment 1 (Steps 205, 206, 207, 208, and 209) is conducted, and recording power, a recording pulse, a tracking position, a focus position, a radial tilt position, a tangential tilt position, a groove parameter, and an equalizing amount for recording information on the optical disk 11 are set in an optimal manner. In an information recording step 309, information from the host computer 19 is recorded on the optical disk 11, and the optical recording apparatus 1 is put in a standby state for recording/reproducing information.

As described above, according to the procedure in FIG. 3, when the optical disk 11 is loaded in the optical recording apparatus 1, information recorded on the optical disk 11 is reproduced preferentially, and after standby for a predetermined period of time, recording learning is conducted. As a result of this procedure, reproduction is conducted preferentially in the optical recording apparatus 1, and hence, a period of time for enabling information on the optical disk 11 to be reproduced is shortened substantially. Furthermore, a period of time for recording learning can be ignored substantially by a user due to the function of recording learning after a predetermined period of time.

The case has been described where the recording learning step 310 is conducted when a time counted in the count-up step becomes a predetermined reference standby time T or longer. However, when reproduction of information is requested in the course of the recording learning step 310, the recording learning step 310 may be suspended to reproduce information preferentially. In this case, information can be reproduced immediately by suspending recording learning, so that a period of time required before a user confirms information can be shortened.

The mode has been described in which the lead-in reproduction step 310 is followed by standby for a predetermined period of time. However, it may be possible that a preferential mode selection switch 21 is provided in the optical recording apparatus 1 as shown in FIG. 1, whereby a mode of conducting a reproduction function preferentially and a mode of conducting a recording function preferentially may be selected. In this case, it is preferable that, for example, as shown in the flow chart in FIG. 4, a reproduction preference function mode determination step 311 is conducted after the lead-in reproduction step 310. In this case, a portion represented by A in FIG. 3 is replaced by a portion represented by B in FIG. 4.

Figure 4:
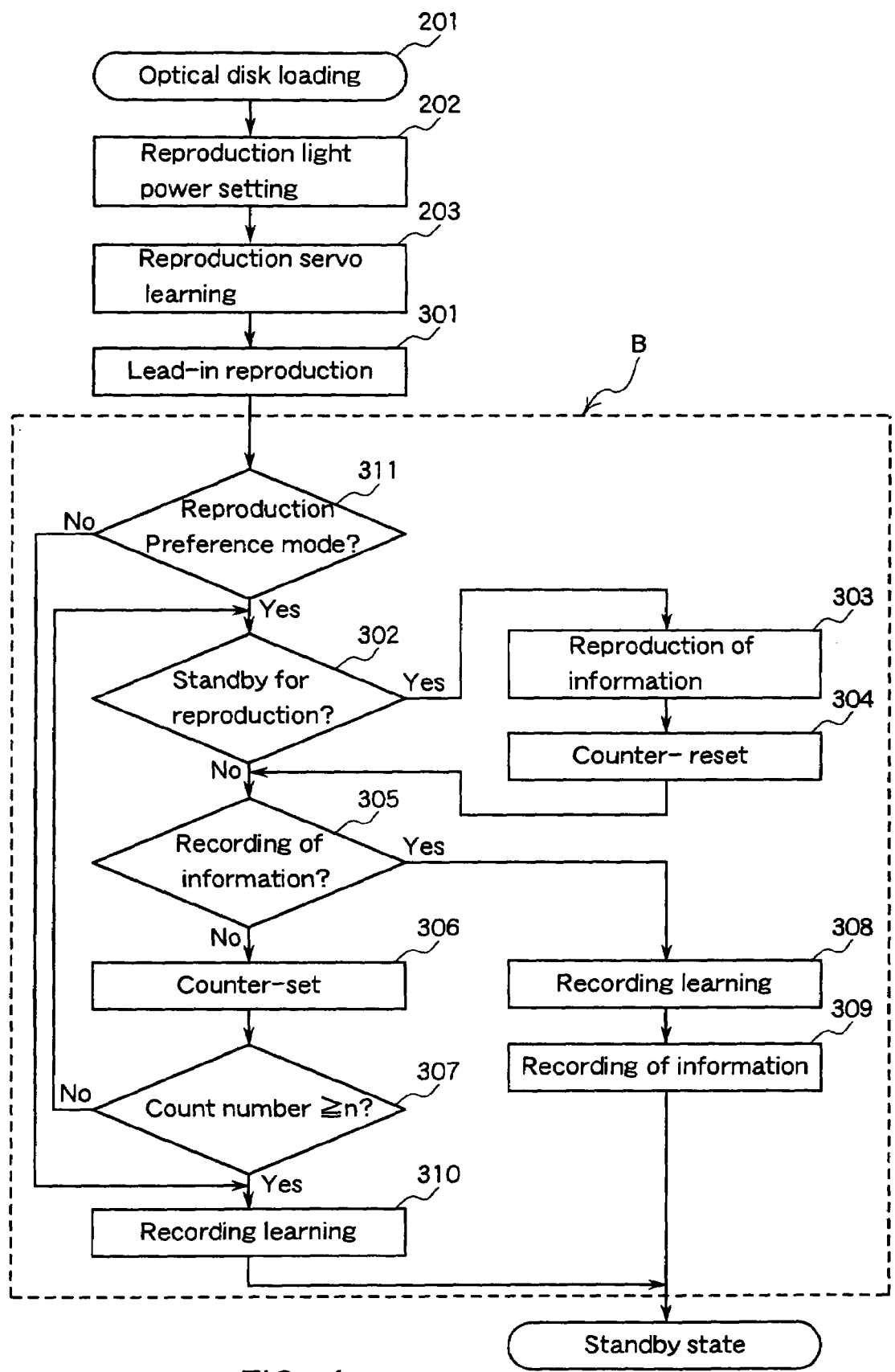
FIG. 4 is a flow chart showing a procedure of a modified optical recording/reproducing method in Embodiment 2 according to the present invention.

As shown in FIG. 4, when it is determined in the reproduction preference function mode determination step 311 that the preferential mode selection switch 21 is set in a recording preference mode (recording learning preference mode) (No), the count-up step is omitted, and the process proceeds to the recording learning step 310. In this step, recording power, a tracking position, a focus position, a radial tilt position, a tangential tilt position, a groove parameter, and an equalizing amount are set in an optimal manner. This step is followed by a standby state for recording/reproducing information.

On the other hand, when it is determined in the reproduction preference function mode determination step 311 that the preferential mode selection switch 21 is set in a reproduction preference mode (Yes), each step in a range represented by A in FIG. 3 is conducted. More specifically, a case where it is desired to record information preferentially and a case where it is desired to reproduce information preferentially are selected, and a standby state can be obtained after steps suitable for the selected mode.

Embodiment 3

An optical recording apparatus and an optical recording/reproducing method will be described in the case where an identifier for identifying whether an optical disk is recordable or write-protected is provided.

Figure 5:
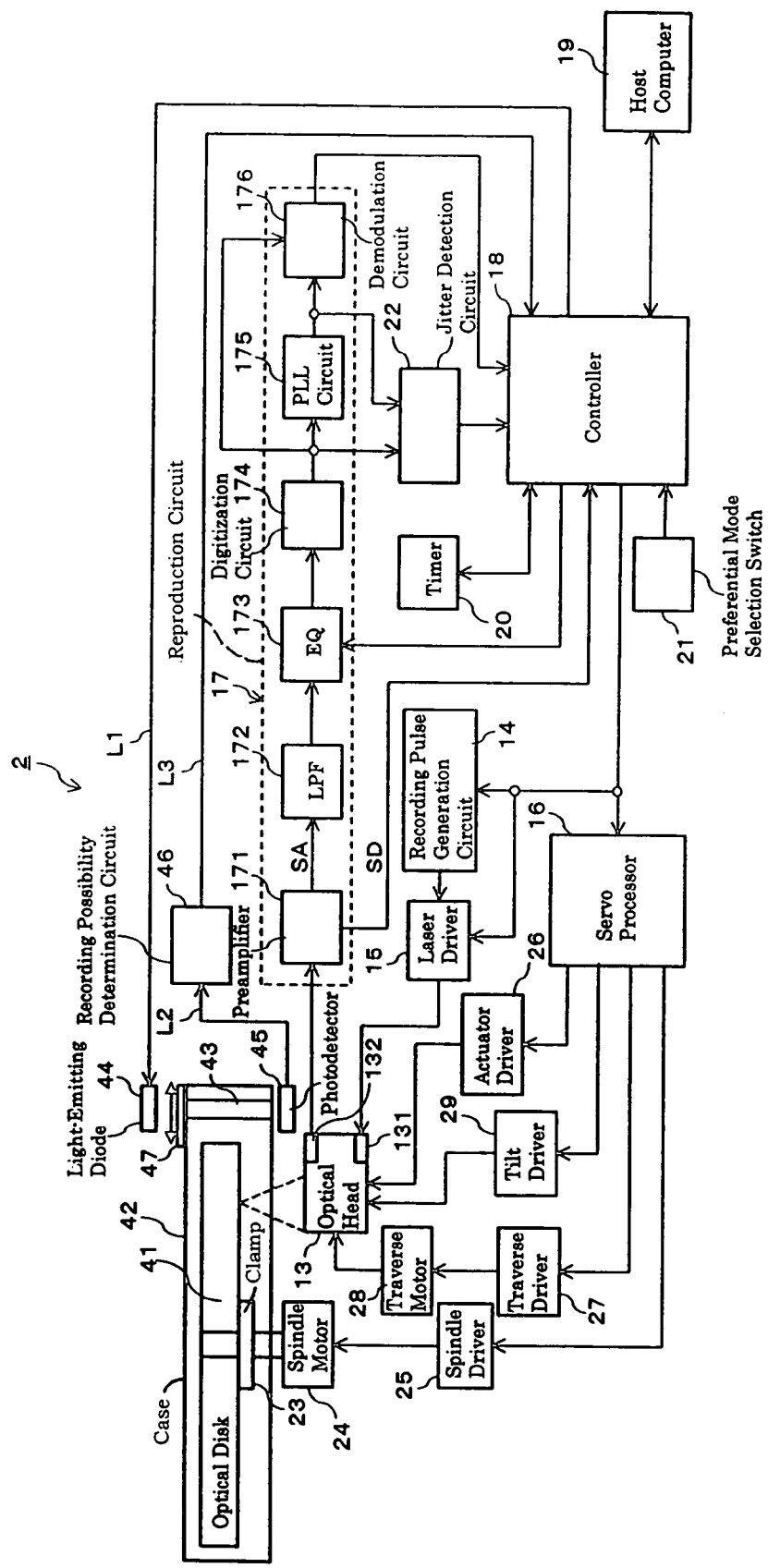
FIG. 5 is a block diagram showing a structure of an optical recording apparatus in Embodiment 3 according to the present invention.

FIG. 5 is a block diagram showing a schematic structure of an optical recording apparatus in Embodiment 3 according to the present invention that records/reproduces information with respect to an optical disk provided with an identifier for identifying whether an optical disk is recordable or write-protected. The components denoted by the same reference numerals as those in Embodiment 1 have structures and functions similar to those therein; therefore, the description thereof will be omitted here.

Referring to FIG. 5, an optical disk 41 is loaded in an optical recording apparatus 2. The optical disk 41 is accommodated in a case 42 for protection of its surface. The case 42 has an identifier hole 43. The identifier hole 43 is opened or closed by a slide 47. It is assumed in the present embodiment that the identifier hole 43 is closed when recording is possible (permitted), and it is opened when recording is impossible (prohibited).

A light-emitting diode 44 is disposed in the optical recording apparatus 2 in such a manner as to be positioned above the identifier hole 43, when the optical disk 41 is loaded in the optical recording apparatus 2. A photodetector 45 is disposed opposing the light-emitting diode 44 with the case 42 therebetween.

When the case 42 accommodating the optical disk 41 is loaded in the optical recording apparatus 2, the controller 18 outputs a signal L1 to allow the light-emitting diode 44 to emit light. Light emitted by the light-emitting diode 44 is incident upon the photodetector 45 through the identifier hole 43, and converted into an electric signal L2. A recording possibility determination circuit 46 detects the signal L1 that turns on/off the light-emitting diode 44 and the signal L2 from the photodetector 45 to determine the possibility of recording, and outputs a determination result output signal L3 to the controller 18.

Next, a procedure of recording/reproducing information with respect to the optical disk 41 by the optical recording apparatus 2 will be described with reference to the flow chart in FIG. 6.

Figure 6:
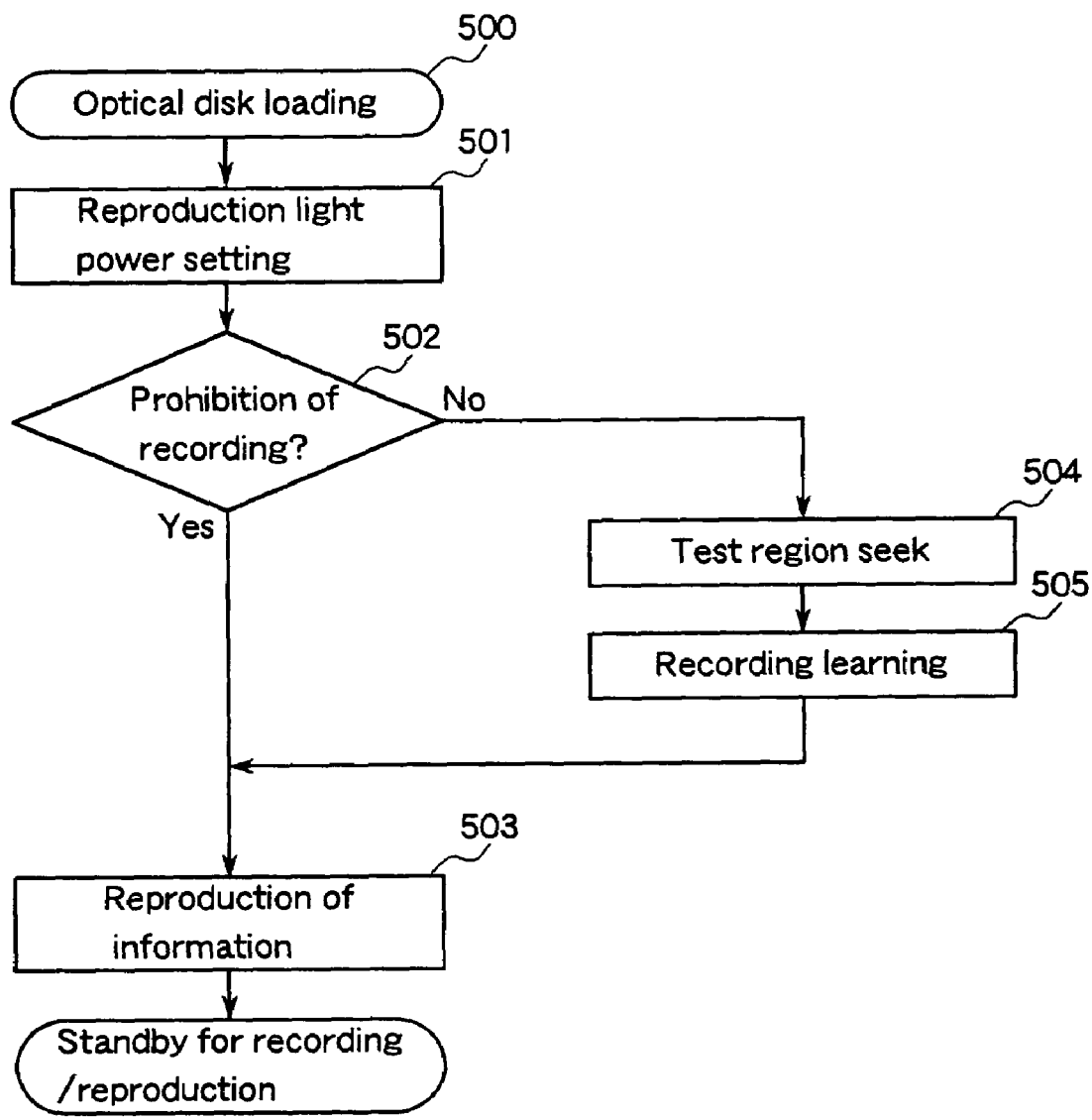
FIG. 6 is a flow chart showing a procedure of an optical recording/reproducing method in Embodiment 3 according to the present invention.

In an optical disk loading step 500 shown in FIG. 6, when the optical disk 41 is inserted into the optical recording apparatus 2 and loaded onto the clamp 23, the controller 18 outputs a drive command to the servo processor 16. The servo processor 16 allows the spindle driver 25 to drive the spindle motor 24, thereby rotating the optical disk 41 at a predetermined rotation rate. In a reproduction light power setting step 501, the laser driver 15 is put in a reproduction mode, and sets the irradiation intensity of laser light at reproduction power. In a recording possibility determination step 502, it is determined based on the information obtained in the recording possibility determination circuit 46 whether or not the optical disk 41 is recordable or write-protected.

When it is determined in the recording possibility determination step 502 that recording onto the optical disk 41 is prohibited (Yes), the process proceeds to an information reproduction step 503, and the reproduction circuit 17 demodulates a signal from the optical head 13 into an information signal. Then, the demodulated signal is sent to the host computer 19 via the controller 18. Thereafter, the optical recording apparatus 2 is put in a standby state for receiving a subsequent command from the host computer 19. Because of this, in the host computer 19, information recorded on the optical disk 41 can be displayed, and a user can confirm the content of the information recorded on the optical disk 41.

On the other hand, when it is determined in the recording possibility determination step 502 that the optical disk 41 is recordable (No), the process proceeds to a test region seek step 504. Then, the servo processor 16 allows the traverse driver 27 to drive the traverse motor 28, in response to a command from the controller 18, and moves the optical head 13 to a test region in the optical disk 41. Then, in a recording learning step 505, for example, recording learning operations similar to the steps 205, 206, 207, 208, and 209 described in Embodiment 1 are conducted. Then, the process returns to a standby state for recording/reproducing user information, after the information reproduction step 503.

Due to the above-mentioned procedure, when the optical disk 41 is in a write protection state, the recording servo learning step 205, the recording power learning step 206, the recording pulse learning step 207, the groove parameter learning step 208, and the equalizing amount learning step 209, required for recording, rewriting, and deleting information, are omitted. Therefore, the optical recording apparatus 2 is put in a standby state for reproducing information in a short period time.

In the above description, when it is determined in the recording possibility determination step 502 that recording is possible, the optical recording apparatus 2 is operated in the order of the steps 504, 505 and 503. However, the optical recording apparatus 2 may be operated in the order of the steps 204 through 209 as described in Embodiment 1. In this case, even when the optical disk 41 is recordable, the directory content of management information recorded on the optical disk 41 first becomes reproducible. This information is transferred to the host computer 19 preferentially, and thereafter, a recording learning step is conducted. Accordingly, a learning operation can be conducted while a user is confirming a directory of recorded information on the host computer side. More specifically, a learning operation can be conducted while a user is confirming the directory of recorded information on the host computer side.

Alternatively, when it is determined in the recording possibility determination step 502 that recording is possible, the optical recording apparatus 2 may be operated in accordance with the procedure represented by A in FIG. 3. In this case, information recorded on the optical disk 41 is reproduced preferentially, and recording learning is conducted after standby for a predetermined period of time. As a result of this procedure, the optical recording apparatus 2 reproduces information preferentially, which substantially shortens a period of time required for the optical disk 41 to become reproducible. Furthermore, due to the function of conducting recording learning after a predetermined period of time, a period of time for recording learning becomes substantially negligible to a user.

In the present embodiment, the identifier hole 43 is provided at the case 42 as a recording identifier. However, another structure may be used as long as the possibility of recording of the case can be identified.

Furthermore, with an optical disk having no case, it is possible that recording possibility information is recorded as a recording identifier in a region on the optical disk, and the optical head 13 is moved to the region upon loading of the optical disk to reproduce recording possibility information for determination of the recording possibility.

Furthermore, the following may be possible: a recording identifier is provided at a case and an optical disk, and the presence of the case is determined; when there is no case, recording possibility information recorded in a region on the optical disk is detected. In this case, irrespective of the presence of the case, recording possibility can be determined.

Embodiment 4

An optical recording/reproducing method will be described in the following case: tracks on circumferences are divided into a plurality of regions depending upon a radial position, an optical disk is rotated for recording at a rotation speed (rotation rate) where an angular velocity is different depending upon a region to which tracks to be recorded belong, and angular velocity becomes constant in one region, and a recording identifier is provided at a case.

Figure 7:
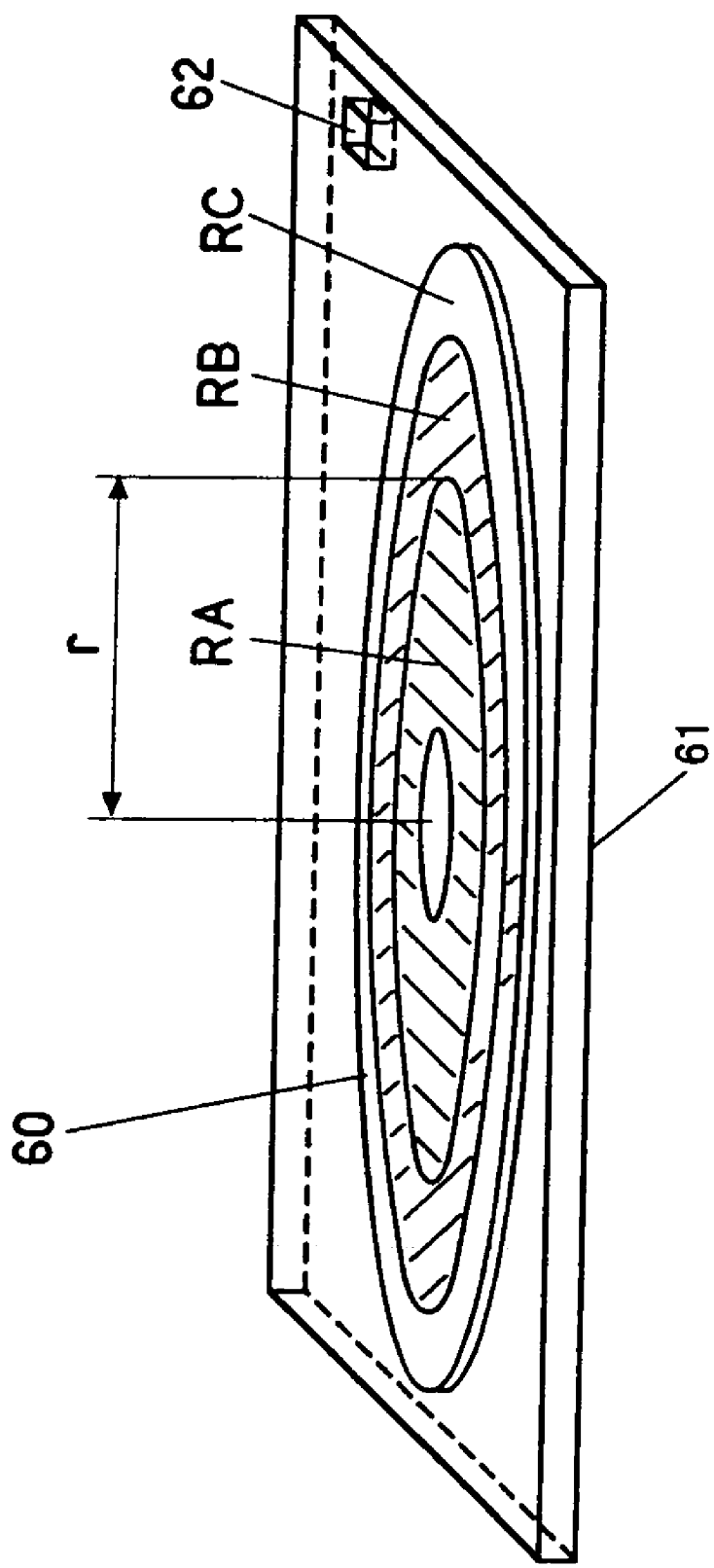
FIG. 7 is a view showing a schematic structure of an optical disk apparatus (optical disk and case) used in Embodiment 4 according to the present invention.

FIG. 7 is a view showing a schematic structure of an optical disk apparatus (optical disk and case) used in the present embodiment.

In FIG. 7, an optical disk 60 is accommodated in a case 61 for protection. The case 61 may be provided with a recording identifier 62 that can be opened/closed for identifying whether or not recording on the optical disk 60 is prohibited, in the same way as in Embodiment 3. The optical disk 60 is divided into a plurality of regions.

FIG. 7 shows an example in which the optical disk 60 is divided into three regions: a region A (RA), a region B (RB), and a region C (RC). The optical disk 60 is divided so that each region has a predetermined distance (radius r) from the rotation center. Each region spreads concentrically on the optical disk 60. More specifically, the regions RA, RB, and RC are partitioned by a circumference determined by a predetermined radius r. For example, with an optical disk having a radius r of 30 to 60 mm, the regions RA and RB should be partitioned by a circumference with a radius of 40 mm, and the regions RB and RC are partitioned by a circumference with a radius of 50 mm. As described above, it is preferable that the respective regions are partitioned so that a distance from the rotation center becomes equal.

The optical disk 60 is divided into regions as described above. In recording, the optical disk 60 is rotated at a rotation rate where an angular velocity becomes lower toward a region of a track on an outer circumference. For example, when an optical disk divided as described above is rotated at 1800 rpm in the region RA, 1350 rpm in the region RB, and 1080 rpm in the region RC, a relative linear velocity (scanning speed) of a track to be recorded and a light beam falls in a range of 5.6 to 7.5 m/s in RA, 5.7 to 7.1 m/s in RB, and 5.7 to 6.8 m/s in RC. That is, a range of a relative linear velocity of a track to be recorded and a recording head becomes substantially the same in the respective regions.

In general, when information is recorded on an optical disk, recording conditions such as the intensity of a recording light beam, and a recording pulse depend upon a linear velocity largely. However, when the range of a linear velocity is set to be substantially the same, information can be recorded under substantially the same recording condition. It is preferable that the difference in linear velocity of the respective regions is set to be at most 2 m/s.

Figure 8:
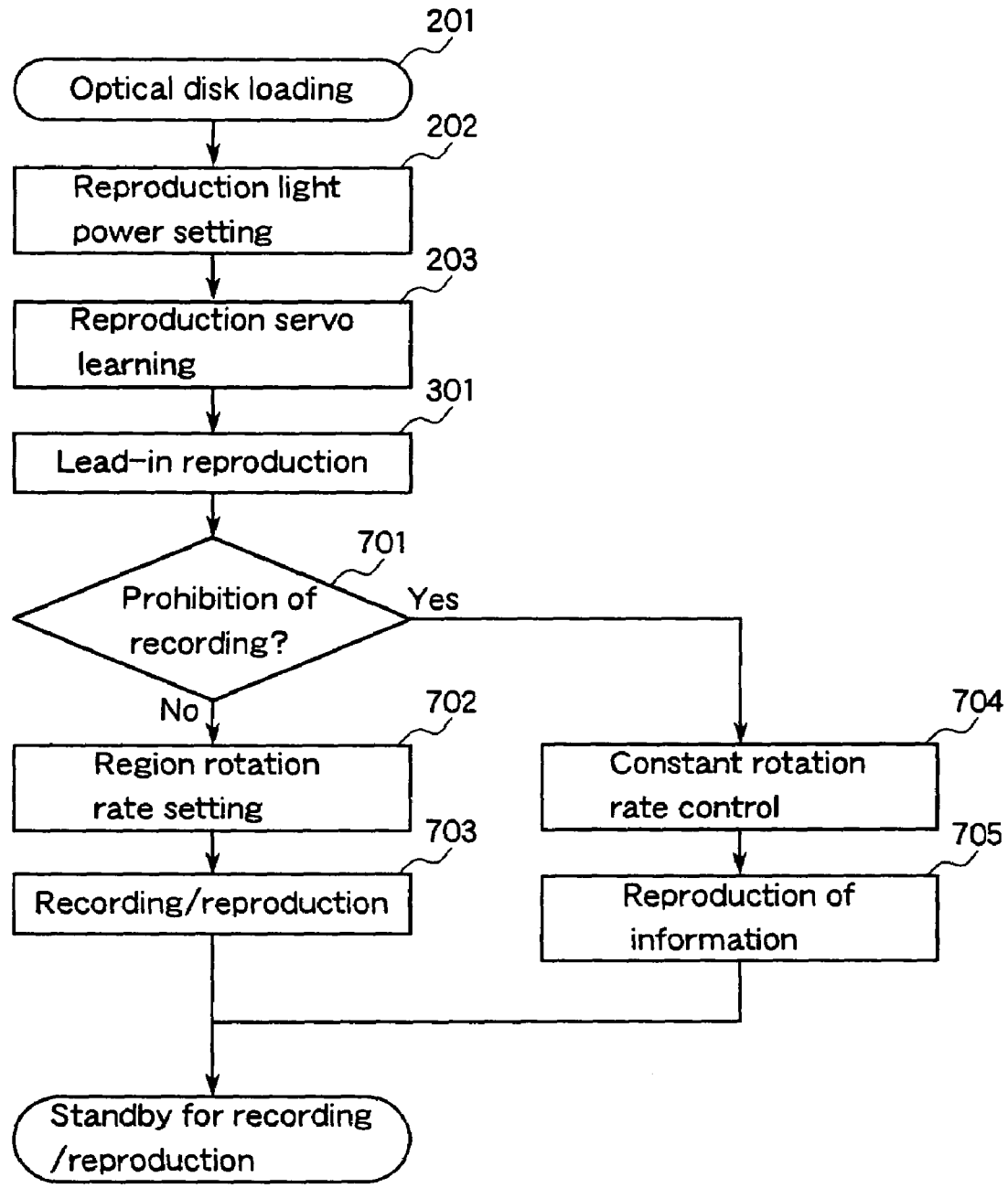
FIG. 8 is a flow chart showing a procedure of an optical recording/reproducing method with respect to the optical disk apparatus shown in FIG. 7.

A procedure of recording/reproducing information with respect to the optical disk 60 shown in FIG. 7 will be described with reference to a flow chart in FIG. 8.

When the optical disk 60 is loaded in an optical recording apparatus 2 (optical recording medium loading step 201), a lead-in region is reproduced in a lead-in reproduction step 301 after a reproduction light power setting step 202 and a reproduction servo learning step 203. In a recording possibility determination step 701, the state of the recording identifier 62 is detected.

When it is determined in the recording possibility determination step 701 that recording is not prohibited (No), the process proceeds to a region rotation rate setting step 702, and the optical recording apparatus 2 is put in a mode of altering the setting of a rotation speed in accordance with each region, as described above. In the subsequent recording/reproducing step 703, for example, a boot-up step for reproducing information preferentially (each step described in Embodiment 1, or a range A in FIG. 3 described in Embodiment 2 or each step in a range B in FIG. 4) is conducted, and the optical disk apparatus 2 is put in a standby state for recording/reproducing information.

On the other hand, when it is determined in the recording possibility determination step 701 that recording is prohibited (Yes), the process proceeds to a constant rotation rate control step 704, and the optical recording apparatus 2 is put in a mode of rotating the optical disk 60 at a constant rotation rate (for example, in all the regions RA, RB, and RC in FIG. 7) irrespective of a region. In the subsequent information reproduction step 705, information recorded on the optical disk 60 is reproduced at a constant rotation rate, and thereafter, the optical recording apparatus 2 is put in a standby state.

Here, reflected light of a light beam radiated onto the optical disk 60 is detected, and recorded information is reproduced based on the change. Therefore, even when a linear velocity is changed, it is not required to change a condition of the output of a light beam and the like. More specifically, as described in the present embodiment, when the optical disk 60 is write-protected, only reproduction of information is conducted, so that it is not required to alter a rotation speed depending upon each region. As a result, a control time required for altering the rotation speed of the optical disk can be omitted, and information of the optical disk can be searched at a high speed.

In the present embodiment, the optical disk is divided into three regions. However, the following may be possible: the optical disk is divided into further regions, and when it is determined that recording is prohibited and a light beam moves over a predetermined number or more of regions, the rotation rate is altered. In this case, the variation in a linear velocity in the same region becomes further smaller when recording is possible, and the rotation rate is altered only when a light beam moves over a predetermined number or more of regions in the case of write-protection. Therefore, the frequency of altering the rotation rate during reproduction becomes small. Accordingly, a time for searching an arbitrary track can be shortened.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical recording/reproducing method for optically recording or reproducing information with respect to an optical recording medium by using an optical recording apparatus, comprising:

a loading step of loading the optical recording medium in the optical recording apparatus;

a reproduction power setting step of setting a power of laser light emitted from the optical recording apparatus to the optical recording medium at reproduction power;

a preliminary information reproduction step of reproducing preliminary information recorded on the optical recording medium with laser light having the reproduction power;

a count-up step of starting count-up of a time after completion of the preliminary information reproduction step; and a recording learning step of extracting a recording condition suitable for the optical recording medium, wherein the recording learning step is conducted after a time counted up during the count-up step becomes at least a predetermined time.

2. An optical recording/reproducing method according to claim 1, wherein, in the count-up step, count-up is continued unless recording or reproduction of user information is requested, when recording of the user information is requested, a process proceeds to the recording learning step, and when reproduction of the user information is requested, the process proceeds to a user information reproduction step of reproducing user information recorded on the optical recording medium with laser light having the reproduction power, and after the user information reproduction step, count-up of a time is restarted after the counted time is reset.

3. An optical recording/reproducing method according to claim 1, further comprising a recording learning preference mode and a reproduction preference mode that are selected alternatively, wherein, when the recording learning preference mode is selected, the process proceeds from the preliminary information reproduction step to the recording learning step, and when the reproduction preference mode is selected, the process proceeds from the preliminary information reproduction step to the count-up step.

4. An optical recording/reproducing method according to claim 1, wherein, in the recording learning step conducted after the count-up step, when reproduction of user information is requested, the recording learning step is suspended, the process proceeds to a user information reproduction step of reproducing user information recorded on the optical recording medium with laser light having the reproduction power, and the recording learning step is restarted after the user information reproduction step.

5. An optical recording/reproducing method according to claim 1, wherein the recording learning step is at least one selected from the group consisting of a recording power learning step of extracting a laser emission power suitable for the optical recording medium, a recording pulse learning step of extracting a recording pulse condition suitable for the optical recording medium, a recording servo learning step of extracting a servo condition suitable for the optical recording medium during recording, a groove parameter learning step of determining a groove parameter of the optical recording medium, and an equalizing amount learning step of determining an equalizing amount with respect to the optical recording medium.

6. An optical recording/reproducing method for optically recording or reproducing information with respect to an optical recording medium by using an optical recording apparatus, comprising:

a loading step of loading the optical recording medium in the optical recording apparatus;

a reproduction power setting step of setting a power of laser light emitted from the optical recording apparatus to the optical recording medium at reproduction power; and a recording possibility identifying step of identifying a possibility of recording information on the optical recording medium, based on a recording identifier, wherein, when prohibition of recording is identified in the recording possibility identifying step, a process proceeds to a user information reproduction step of reproducing user information recorded on the optical recording medium with laser light having the reproduction power, or a reproduction standby step of waiting for a request for reproduction of the user information, and when permission of recording is identified in the recording possibility identifying step, a preliminary information reproduction step of reproducing preliminary information recorded on the optical recording medium, with laser light having the reproduction power, a count-up step of starting count-up of a time after completion of the preliminary information reproduction step, and a recording learning step of extracting a recording condition suitable for the optical recording medium are conducted in this order, and the recording learning step is conducted after a time counted up during the count-up step becomes at least a predetermined time.

7. An optical recording/reproducing method according to claim 6, wherein the recording identifier is provided at the optical recording medium.

8. An optical recording/reproducing method according to claim 6, wherein the recording identifier is provided at a case accommodating the optical recording medium.

9. An optical recording/reproducing method according to claim 6, wherein the recording identifier includes a first recording identifier provided at the optical recording medium and a second recording identifier provided at a case accommodating the optical recording medium.

10. An optical recording/reproducing method according to claim 6, wherein the recording learning step is at least one selected from the group consisting of a recording power learning step of extracting a laser emission power suitable for the optical recording medium, a recording pulse learning step of extracting a recording pulse condition suitable for the optical recording medium, a recording servo learning step of extracting a servo condition suitable for the optical recording medium during recording, a groove parameter learning step of determining a groove parameter of the optical recording medium, and an equalizing amount learning step of determining an equalizing amount with respect to the optical recording medium.

11. An optical recording/reproducing method for optically recording or reproducing information with respect to an optical recording medium by using an optical recording apparatus, comprising:

a loading step of loading the optical recording medium in the optical recording apparatus;

a reproduction power setting step of setting a power of laser light emitted from the optical recording apparatus to the optical recording medium at reproduction power;

a recording possibility identifying step of identifying a possibility of recording information on the optical recording medium, based on a recording identifier; and a rotation speed control step of controlling a rotation speed of the optical recording medium, based on the identified possibility of recording, wherein, when prohibition of recording is identified during the recording possibility identifying step, a mode of prescribing a rotation speed of the optical recording medium to be constant is selected during the rotation speed control step, and when permission of recording is identified during the recording possibility identifying step, a mode of controlling a rotation speed of the optical recording medium for each region so as to alleviate a difference in scanning speed of the laser light in a plurality of regions partitioned based on a distance from a rotation center of the optical recording medium is selected during the rotation speed control step.

12. An optical recording/reproducing method according to claim 11, wherein, when permission of recording is identified during the recording possibility identifying step, a rotation speed of the optical recording medium is controlled for each of the regions so that a scanning speed of laser light becomes substantially the same in the plurality of regions.

13. An optical recording/reproducing method of an optical recording medium according to claim 11, wherein, when prohibition of recording is identified during the recording possibility identifying step, a user information reproduction step of reproducing user information recorded on the optical recording medium with laser light having the reproduction power, or a reproduction standby step of waiting for a request for reproduction of the user information is conducted, and when permission of recording is identified during the recording possibility identifying step, a management information reproduction step of reproducing management information for managing user information recorded on the optical recording medium, with laser light having the reproduction power, and a recording learning step of extracting a recording condition suitable for the optical recording medium are further conducted in this order.

14. An optical recording/reproducing method according to claim 13, wherein the recording learning step is at least one selected from the group consisting of a recording power learning step of extracting a laser emission power suitable for the optical recording medium, a recording pulse learning step of extracting a recording pulse condition suitable for the optical recording medium, a recording servo learning step of extracting a servo condition suitable for the optical recording medium during recording, a groove parameter learning step of determining a groove parameter of the optical recording medium, and an equalizing amount learning step of determining an equalizing amount with respect to the optical recording medium.

15. An optical recording/reproducing method according to claim 11, wherein, when prohibition of recording is identified during the recording possibility identifying step, a user information reproduction step of reproducing user information recorded on an optical recording medium, with laser light having the reproduction power, or a reproduction standby step of waiting for a request for reproduction of the user information is further conducted, and when permission of recording is identified during the recording possibility identifying step, a preliminary information reproduction step of reproducing preliminary information recorded on the optical recording medium with laser light having the reproduction power, a count-up step of starting count-up of a time after completion of the preliminary information reproduction step, and a recording learning step of extracting a recording condition suitable for the optical recording medium are conducted in this order, and the recording learning step is further conducted when a time counted up during the count-up step becomes at least a predetermined time.

16. An optical recording/reproducing method according to claim 15, wherein the recording learning step is at least one selected from the group consisting of a recording power learning step of extracting a laser emission power suitable for the optical recording medium, a recording pulse learning step of extracting a recording pulse condition suitable for the optical recording medium, a recording servo learning step of extracting a servo condition suitable for the optical recording medium during recording, a groove parameter learning step of determining a groove parameter of the optical recording medium, and an equalizing amount learning step of determining an equalizing amount with respect to the optical recording medium.

17. An optical recording apparatus for optically recording or reproducing information with respect to an optical recording medium, comprising:

loading means for loading the optical recording medium;

an optical head for emitting laser light to the loaded optical recording medium;

reproduction power setting means for setting a power of the laser light at reproduction power;

information reproduction means for reproducing information recorded on the optical recording medium, with laser light having the reproduction power;

count-up means for starting count-up of a time after completion of a reproduction operation of preliminary information recorded on the optical recording medium by the information reproduction means;

recording learning means for extracting a recording condition suitable for the optical recording medium; and control means for operating the recording learning means after a time counted up by the count-up means becomes at least a predetermined time.

18. An optical recording apparatus according to claim 17, wherein, during an operation of the count-up means, the control means allows the operation of the count-up means to continue unless recording or reproduction of user information is requested, when recording of the user information is requested, the control means operates the recording learning means, and when reproduction of the user information is requested, the control means allows the information reproduction means to reproduce information recorded on the optical recording medium with laser light having the reproduction power, and restarts the operation of the count-up means after resetting of a time counted up by the count-up means after completion of the operation of the information reproduction means.

19. An optical recording apparatus according to claim 17, wherein the optical recording apparatus further comprises preferential mode selection means for selecting a recording learning preference mode and a reproduction preference mode alternatively, when the recording learning preference mode is selected by the preferential mode selection means, the control means operates the recording learning means after completion of a reproduction operation of the preliminary information by the information reproduction means, and when the reproduction preference mode is selected by the preferential mode selection means, the control means operates the count-up means after completion of the reproduction operation by the information reproduction means.

20. An optical recording apparatus according to claim 17, wherein, during an operation of the recording learning means after an operation of the count-up means, when reproduction of user information is requested, the control means suspends the operation of the recording learning means to operate the information reproduction means, and restarts the operation of the recording learning means after completion of the operation of the information reproduction means.

21. An optical recording apparatus according to claim 17, wherein the recording learning means is at least one selected from the group consisting of recording power learning means for extracting a laser emission power suitable for the optical recording medium, recording pulse learning means for extracting a recording pulse condition suitable for the optical recording medium, recording servo learning means for extracting a servo condition suitable for the optical recording medium during recording, groove parameter learning means for determining a groove parameter of the optical recording medium, and equalizing amount learning means for determining an equalizing amount with respect to the optical recording medium.

22. An optical recording apparatus for optically recording or reproducing information with respect to an optical recording medium, comprising:
- loading means for loading the optical recording medium;
- an optical head for emitting laser light to the loaded optical recording medium;
- reproduction power setting means for setting a power of the laser light at reproduction power;
- recording possibility identifying means for identifying a possibility of recording information on the optical recording medium based on a recording identifier;
- information reproduction means for reproducing information recorded on the optical recording medium with laser light having the reproduction power;
- count-up means for starting count-up of a time after completion of an operation of the information reproduction means;
- recording learning means for extracting a recording condition suitable for the optical recording medium; and
- control means for, when prohibition of recording is identified by the recording possibility identifying means, operating the information reproduction means immediately after completion of operations of the recording possibility identifying means and the reproduction power setting means, or in response to a request for reproduction of the information after completion of operations of the recording possibility identifying means and the reproduction power setting means, and when permission of recording is identified by the recording possibility identifying means, allowing the information reproduction means to reproduce preliminary information recorded on the optical recording medium after completion of operations of the recording possibility identifying means and the reproduction power setting means, operating the count-up means after completion of an operation of the information reproduction means, and operating the recording learning means after a time counted up by the count-up means becomes at least a predetermined time.

23. An optical recording/reproducing method according to claim 22, wherein the recording identifier is provided at the optical recording medium.

24. An optical recording/reproducing method according to claim 22, wherein the recording identifier is provided at a case accommodating the optical recording medium.

25. An optical recording/reproducing method according to claim 22, wherein the recording identifier comprises a first recording identifier provided at the optical recording medium and a second recording identifier provided at a case accommodating the optical recording medium.

26. An optical recording apparatus according to claim 22, wherein the recording learning means is at least one selected from the group consisting of recording power learning means for extracting a laser emission power suitable for the optical recording medium, recording pulse learning means for extracting a recording pulse condition suitable for the optical recording medium, recording servo learning means for extracting a servo condition suitable for the optical recording medium during recording, groove parameter learning means for determining a groove parameter of the optical recording medium, and equalizing amount learning means for determining an equalizing amount with respect to the optical recording medium.

27. An optical recording apparatus for optically recording or reproducing information with respect to an optical recording medium, comprising:
- loading means for loading the optical recording medium;
- an optical head for emitting laser light to the loaded optical recording medium;
- reproduction power setting means for setting a power of the laser light at reproduction power;
- recording possibility identifying means for identifying a possibility of recording information on the optical recording medium based on a recording identifier;
- information reproduction means for reproducing information recorded on the optical recording medium with laser light having the reproduction power;
- rotation speed control means for controlling a rotation speed of the optical recording medium; and
- control means for, when prohibition of recording is identified by the recording possibility identifying means, selecting a mode of allowing the rotation speed control means to control a rotation speed of the optical recording medium to be constant, and
when permission of recording is identified by the recording possibility identifying means, selecting a mode of allowing the rotation speed control means to control a rotation speed of the optical recording medium for each region so as to alleviate the difference in scanning speed of the laser light in a plurality of regions of the optical recording medium partitioned based on a distance from a rotation center.

28. An optical recording apparatus according to claim 27, wherein, when permission of recording is identified by the recording possibility identifying means, the control means controls a rotation speed of the optical recording medium for each region so that a scanning speed of laser light in a plurality of regions becomes substantially the same.

29. An optical recording apparatus according to claim 27, wherein, when prohibition of recording is identified by the recording possibility identifying means, the control means operates the information reproduction means immediately after completion of an operation of the rotation speed control means, or in response to a request for reproduction of the information after completion of an operation of the rotation speed control means, and when permission of recording is identified by the recording possibility identifying means, after completion of an operation of the rotation speed control means, the control means allows the information reproduction means to reproduce management information for managing user information recorded on the optical recording medium, and then operates recording learning means for extracting a recording condition suitable for the optical recording means.

30. An optical recording apparatus according to claim 29, wherein the recording learning means is at least one selected from the group consisting of recording power learning means for extracting a laser emission power suitable for the optical recording medium, recording pulse learning means for extracting a recording pulse condition suitable for the optical recording medium, recording servo learning means for extracting a servo condition suitable for the optical recording medium during recording, groove parameter learning means for determining a groove parameter of the optical recording medium, and equalizing amount learning means for determining an equalizing amount with respect to the optical recording medium.

31. An optical recording apparatus according to claim 27, wherein, when prohibition of recording is identified by the recording possibility identifying means, the control means operates the information reproduction means immediately after completion of an operation of the rotation speed control means, or in response to a request for reproduction of the information after completion of an operation of the rotation speed control means, and when prohibition of recording is identified by the recording possibility identifying means, the control means allows the information reproduction means to reproduce preliminary information recorded on the optical recording medium after completion of an operation of the rotation speed control means, operates the count-up means after completion of an operation of the information reproduction means, and operates recording learning means for extracting a recording condition suitable for the optical recording medium after a time counted up by the count-up means becomes at least a predetermined time.

32. An optical recording apparatus according to claim 31, wherein the recording learning means is at least one selected from the group consisting of recording power learning means for extracting a laser emission power suitable for the optical recording medium, recording pulse learning means for extracting a recording pulse condition suitable for the optical recording medium, recording servo learning means for extracting a servo condition suitable for the optical recording medium during recording, groove parameter learning means for determining a groove parameter of the optical recording medium, and equalizing amount learning means for determining an equalizing amount with respect to the optical recording medium.

* * * * *

UNITED STATES PATENT AND TRADEMARK OFFICE
CERTIFICATE OF CORRECTION

| | | |
|---|---|---|
| PATENT NO. | : 7,158,458 B2 | Page 1 of 1 |
| APPLICATION NO. | : 11/100194 | |
| DATED | : January 2, 2007 | |
| INVENTOR(S) | : Furukawa et al. | |

It is certified that error appears in the above-identified patent and that said Letters Patent is hereby corrected as shown below:

Title page, second column, line 12 of the Abstract: "based the" should read --based on the--.

Signed and Sealed this

Twenty-sixth Day of February, 2008

JON W. DUDAS
*Director of the United States Patent and Trademark Office*